(12) United States Patent
Lemaitre et al.

(10) Patent No.: US 9,645,469 B2
(45) Date of Patent: May 9, 2017

(54) ELECTRO-OPTIC (E/O) DEVICE WITH AN E/O AMPLITUDE MODULATOR AND ASSOCIATED METHODS

(71) Applicants: STMICROELECTRONICS (CROLLES 2) SAS, Crolles (FR); STMICROELECTRONICS SA, Montrouge (FR)

(72) Inventors: Patrick Lemaitre, Biviers (FR); Jean-Francois Carpentier, Grenoble (FR); Charles Baudot, Lumbin (FR); Jean-Robert Manouvrier, Echirolles (FR)

(73) Assignees: STMICROELECTRONICS (CROLLES 2) SAS, Crolles (FR); STMICROELECTRONICS SA, Montrouge (FR)

( * ) Notice: Subject to any disclaimer, the term of this patent is extended or adjusted under 35 U.S.C. 154(b) by 5 days.

(21) Appl. No.: 14/836,011

(22) Filed: Aug. 26, 2015

(65) Prior Publication Data
US 2017/0059893 A1 Mar. 2, 2017

(51) Int. Cl.
*G02F 1/225* (2006.01)
*G02F 1/025* (2006.01)
*G02F 1/21* (2006.01)

(52) U.S. Cl.
CPC .............. *G02F 1/225* (2013.01); *G02F 1/025* (2013.01); *G02F 1/2257* (2013.01); *G02F 2001/212* (2013.01); *G02F 2203/15* (2013.01)

(58) Field of Classification Search
None
See application file for complete search history.

(56) References Cited

U.S. PATENT DOCUMENTS

| | | | |
|---|---|---|---|
| 6,795,594 B2 | 9/2004 | Betty | |
| 7,376,356 B2 * | 5/2008 | Madsen | ............. H04J 14/0298 398/183 |
| 7,515,778 B2 | 4/2009 | Mosinskis et al. | |
| 8,238,014 B2 | 8/2012 | Kucharski et al. | |
| 8,665,508 B2 | 3/2014 | Kucharski et al. | |
| 2011/0170161 A1 | 7/2011 | Gill et al. | |
| 2014/0186028 A1 | 7/2014 | Kucharski et al. | |

OTHER PUBLICATIONS

Kaneshige et al. "Low-voltage quantum well microring-enhanced Mach-Zehnder modulator", Optics Express, Jul. 15, 2013, vol. 21, No. 4, pp. 16888-16900.*

(Continued)

*Primary Examiner* — Michelle R Connelly
(74) *Attorney, Agent, or Firm* — Slater Matsil, LLP (57) ABSTRACT

An electro-optic (E/O) device includes an asymmetric optical coupler having an input and first and second outputs, a first optical waveguide arm coupled to the first output of the first asymmetric optical coupler, and a second optical waveguide arm coupled to the second output of the first asymmetric optical coupler. At least one E/O amplitude modulator is coupled to at least one of the first and second optical waveguide arms. An optical combiner is coupled to the first and second optical waveguide arms downstream from the at least one E/O amplitude modulator.

25 Claims, 6 Drawing Sheets

(56) References Cited

OTHER PUBLICATIONS

Li et al. "A Ring-Resonator-Based Silicon Photonics Transceiver with Bias-Based Wavelength Stabilization and Adaptive-Power-Sensitivity Receiver" ISSCC 2013 / Session 7 / Optical Transceivers and Silicon Photonics / 7.5: 2013 IEEE International Solid-State Circuits Conference; pp. 124-126.
Xie et al. "Linearized Mach-Zehnder intensity modulator" Photonics Technology Letters, IEEE (vol. 15 , Issue: 4) Apr. 2003: Abstract Only.
Tazaswa et al. "Bandwidth of linearized ring resonator assisted Mach-Zehnder modulator" Photonics Technology Letters, IEEE (vol. 17 , Issue: 9 ) Sep. 2005: Abstract Only.
"Mach-Zehnder Interferometer" Wikipedia: https://en.wikipedia.org/wiki/mach%E2%80%93Zehnder_interferometer: Retrieved from internet Jul. 13, 2015; 5 pgs.
Mao, B. et al., "Highly linear dual parallel Mach-Zehnder modulator incorporating Mmi couplers," Journal of the European Optical Society—Rapid Publications, vol. 10, 15004, Jan. 29, 2015, pp. 1-7.
Ueda, Y. et al., "Very-low-voltage operation of Mach-Zehnder interferometer-type electroabsorption modulator using asymmetric couplers," Optics Express, vol. 22, No. 12, Jun. 6, 2014, pp. 14610-14616.
Yue, P. et al., "A MMI-based ultra-linear high-gain modulator and its performance analysis," Optics & Laser Technology, vol. 53, May 23, 2013, pp. 33-39.
Zhuang, L et al., "Novel wideband microwave polarization network using a fully-reconfigurable photonic waveguide nterleaver with a two-ring resonator-assited asymmetric Mach-Zehnder structure," Optics Express, vol. 21, No. 3, Feb. 1, 2013, pp. 3114-3124.

* cited by examiner

ELECTRO-OPTIC (E/O) DEVICE WITH AN E/O AMPLITUDE MODULATOR AND ASSOCIATED METHODS

FIELD OF THE INVENTION

The present invention relates to the field of optical transmission systems, and more particularly, to an electro-optical (E/O) amplitude modulator for multilevel modulation of an optical signal and related methods.

BACKGROUND OF THE INVENTION

Optical transmission systems are generally based on direct modulation or external modulation of an optical input signal. External modulation is preferred for high speed applications.

External modulation of an optical input signal involves applying an electrical modulating signal to a continuous wave (CW) optical signal provided by an optical source, such as a laser. Electro-optic modulators, such as Mach-Zehnder interferometers (MZIs), are typically used for high speed applications.

A Mach-Zehnder modulator controls the amplitude of an optical signal. An input waveguide is split into two waveguide interferometer arms. When a voltage is applied across one of the waveguide arms, a phase shift is induced for the optical signal in that waveguide arm. The optical signals from the two waveguide interferometer arms are then recombined. Changing the electric field on the phase modulating path determines whether the two optical signals interfere constructively or destructively at the output, thereby controlling the amplitude or intensity of the optical output signal.

A ring-assisted Mach-Zehnder interferometer (RAMZI) has the same behavior as a Mach-Zehnder interferometer, but uses a ring to modify the phase. The ring may be active or passive to modify the phase. The ring-assisted Mach-Zehnder interferometer has the same power in each waveguide arm, and the phase in each waveguide arm is changed using modulation diodes. A phase difference results in a modulation of amplitude. The ring in the Mach-Zehnder interferometer is used to improve the linearity of the modulator, which in turn improves the extinction ratio. A change in the power amplitude is seen as a side effect, which is to be reduced in the ring-assisted Mach-Zehnder interferometer.

As an alternative to the Mach-Zehnder modulator and the ring-assisted Mach-Zehnder interferometer, a segmented optical modulator is disclosed in U.S. Pat. No. 7,515,778. The optical modulator includes an adjustable drive arrangement for dynamically adjusting the effective length of the optical signals paths within the modulator. Each modulator arm is partitioned into a plurality of segments, with each segment coupled to a separate electrical signal driver. The effective length of each modulator arm will be a function of the number of drivers that are activated for each arm at any given point in time. A feedback arrangement may be used with the plurality of drivers to dynamically adjust the operation of the modulator by measuring the extinction ratio as a function of optical power, and turning on or off individual drivers accordingly.

The above approaches for modulating an optical input signal are based on controlling the phase differences between the optical waveguide arms which creates the difference in amplitude in the optical output signal. The optical waveguide arms typically need to be a sufficient length in order to have a phase difference that produces a ratio P(bit1)/P(bit0) at the output of the Mach-Zehnder modulator large enough to meet the specification of the link. This ratio is referred to as the Extinction Ratio. For typical PN modulation diodes used in silicon photonics, the minimum length is typically 0.3 mm at a voltage of 1.8V. This effects the size and compactness of electro-optic (E/O) devices. Even though more advanced devices may be used to create a better difference of phase, they are often more complicated and expensive to make.

SUMMARY OF THE INVENTION

An electro-optic (E/O) device comprises a first asymmetric optical coupler having an input and first and second outputs, a first optical waveguide arm coupled to the first output of the first asymmetric optical coupler, and a second optical waveguide arm coupled to the second output of the first asymmetric optical coupler. At least one first E/O amplitude modulator may be coupled to at least one of the first and second optical waveguide arms. A first optical combiner may be coupled to the first and second optical waveguide arms downstream from the at least one first E/O amplitude modulator.

The E/O device does not rely on phase differences between the optical waveguide arms to change states of an output optical signal provided by the first optical combiner. Instead, the first asymmetric optical coupler splits an optical input signal received at the input thereof into first and second optical signals for the first and second optical waveguide arms, with the first and second optical signals having equal phases but at different power levels. This advantageously allows the state of the output optical signal to be changed by changing an amplitude of at least one of the first and second optical signals on at least one of the first and second optical waveguide arms.

A length of the first and second optical waveguide arms can be shortened since phase differences between the first and second optical signals in the first and second optical waveguide arms do not need to be determined since the phases are equal. This advantageously allows the E/O device to be smaller in size and more compact as compared to E/O devices that rely on such phase differences for changing states of an output optical signal.

The E/O device may further comprise an optical source coupled to the input of the first asymmetrid optical coupler, and the optical source may be configured to generate a continuous optical input signal. The E/O device may further comprise at least one optical phase adjuster coupled to at least one of the first and second optical waveguide arms. The at least one optical phase adjuster may be used to compensate for any phase differences introduced by the first asymmetric optical coupler.

The at least one first E/O amplitude modulator may comprise an optical ring modulator. The optical ring modulator may comprise a ring having a radius within a range of 5-10 μm. The at least one E/O amplitude modulator may comprises a first optical ring modulator coupled to the first optical waveguide arm, and a second optical ring modulator coupled to the second optical waveguide arm. The first and second optical ring modulators are configured to support a pulse amplitude modulation (PAM) 4, whereby the optical output signal has 4 different states.

The first asymmetric coupler may comprise at least one of an asymmetric multimode interference (MMI) coupler and an asymmetric dc coupler. The first optical combiner may comprise a symmetric combiner. The symmetric combiner may comprise a multimode interference (MMI) Y-junction coupler.

The E/O device may further comprise a second asymmetric coupler having an input coupled to the second output of the first asymmetrical coupler and have first and second outputs, with the first output of the second asymmetric coupler being coupled to the second optical waveguide arm. A third optical waveguide arm may be coupled to the second output of the second asymmetric coupler. At least one second E/O amplitude modulator may be coupled to the third optical waveguide arms. A second optical combiner may be coupled to an output of the first optical combiner and the third optical waveguide arm downstream from the at least one second E/O amplitude modulator. When each of the first, second and third optical waveguide arms has a respective E/O amplitude modulator coupled thereto, a pulse amplitude modulation (PAM) 8 is supported, whereby the optical output signal has 8 different states.

The E/O device may further comprise a second asymmetric optical coupler having an input and first and second outputs, a third optical waveguide arm coupled to the first output of the second asymmetric optical coupler, and a fourth optical waveguide arm coupled to the second output of the second asymmetric optical coupler. At least one second E/O amplitude modulator may be coupled to at least one of the third and fourth optical waveguide arms. A second optical combiner may be coupled to the third and fourth optical waveguide arms downstream from the at least one second E/O amplitude modulator. A third asymmetric optical coupler may have first and second outputs coupled to respective inputs the first and second asymmetric couplers. A third optical combiner may have first and second inputs coupled to respective outputs of the first and second combiners. When each of the first, second, third and fourth optical waveguide arms has a respective E/O amplitude modulator coupled thereto, a pulse amplitude modulation (PAM) 16 is supported, whereby the optical output signal has 16 different states.

Another aspect is directed to a method for modulating an optical input signal using an electro-optic (E/O) device as described above. The method comprises providing an optical input signal to the input of the first asymmetric optical coupler to provide a first optical signal at the first output of the first asymmetric optical coupler, and a second optical signal at the second output of the first asymmetric optical coupler. The method may further comprise modulating an amplitude of at least one of the first and second optical signals using the at least one first E/O amplitude modulator coupled to at least one of the first and second optical waveguide arms, and combining the first and second optical signals in the first and second optical waveguide arms after modulating the amplitude of at least one of the first and second optical signals.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notations are used to indicate similar elements in alternative embodiments.

Figures 1, 2:
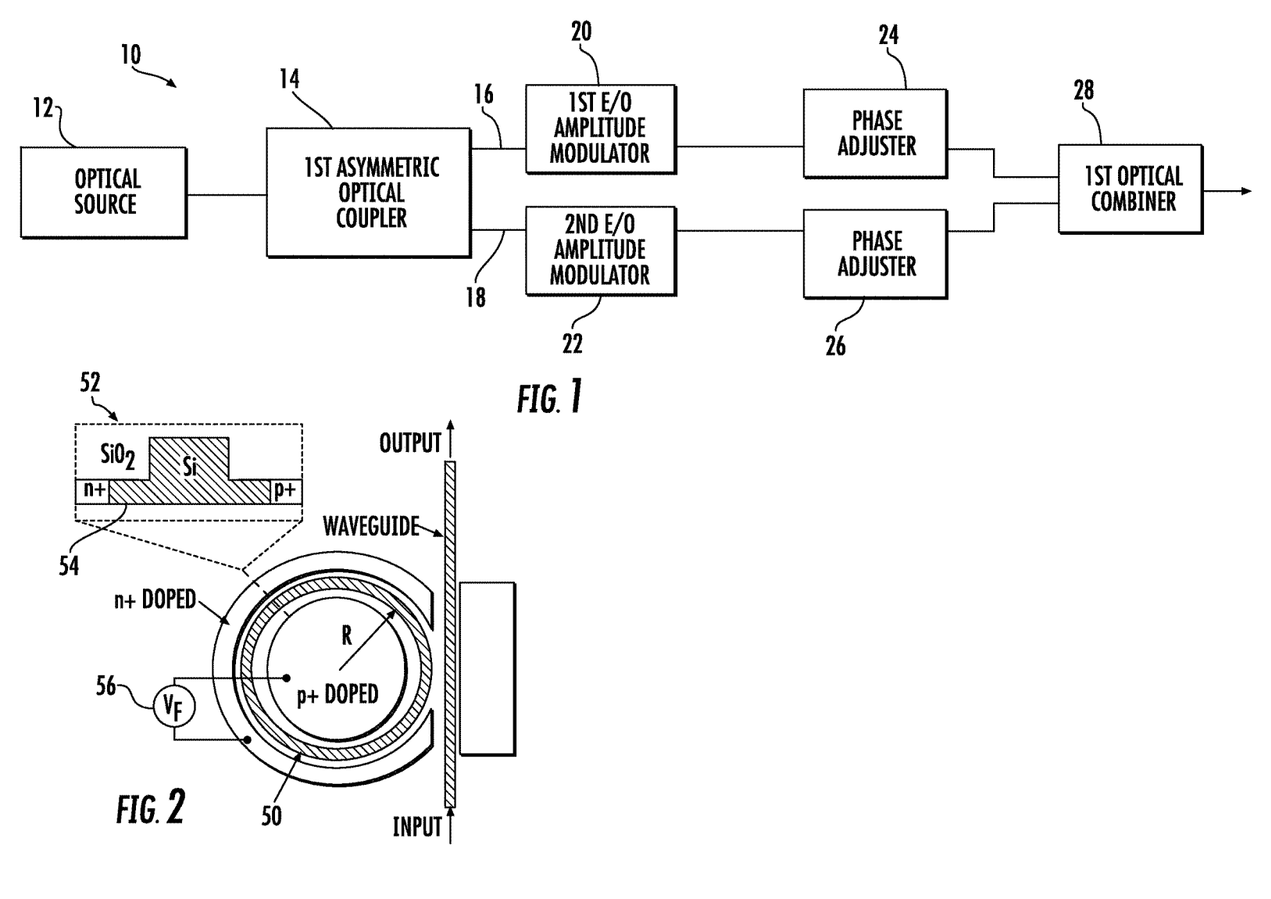
FIG. 1 is a block diagram of an electro-optic (E/O) device with an E/O amplitude modulator in accordance with the present invention.
FIG. 2 is a schematic diagram of one example of the E/O amplitude modulator illustrated in FIG. 1.

Referring initially to FIG. 1, an electro-optic (E/O) device 10 includes a first asymmetric optical coupler or splitter 14 having an input and first and second outputs. A first optical waveguide arm 16 is coupled to the first output of the first asymmetric optical coupler 14. A second optical waveguide arm 18 is coupled to the second output of the first asymmetric optical coupler 14. A first E/O amplitude modulator 20 is coupled to the first optical waveguide arm 16, and a second E/O amplitude modulator 22 is coupled to the second optical waveguide arm 18. A first optical combiner 28 is coupled to the first and second optical waveguide arms 16, 18 downstream from the first and second E/O amplitude modulators 20, 22.

An optical source 12 is coupled to the input of the first asymmetric optical coupler 14. The optical source 12 may be a laser, for example, and generates a continuous wave (CW) optical input signal.

The E/O device 10 does not rely on phase differences between the optical waveguide arms 16, 18 to change states of an output optical signal provided by the first optical combiner 28. Instead, the first asymmetric optical coupler 14 splits the optical input signal received at the input thereof into first and second optical signals for the first and second optical waveguide arms 16, 18, with the first and second optical signals having equal phases but at different power levels. This advantageously allows the state of the output optical signal to be changed by changing an amplitude of at least one of the first and second optical signals on at least one of the first and second optical waveguide arms 16, 18.

The E/O device 10 optionally includes at least one optical phase adjuster 24, 26 coupled to at least one of the first and second optical waveguide arms 16, 18. In the illustrated embodiment, each optical waveguide arm has a respective optical phase adjuster coupled thereto. The optical phase adjusters 24, 26 are used to compensate for any phase differences introduced by the first asymmetric optical coupler 14. The optical phase adjusters 24, 26 may be individually operated so that each of the first and second optical waveguide arms 16, 18 have the same state, for example, which means that they are at the same phase.

The E/O device 10 operates based on power amplitude modulation (PAM) where information is encoded in the amplitude of a series of optical pulses. In the illustrated E/O device, PAM 4 is supported since the first and second waveguide arms 16, 18 each have their respective E/O amplitude modulator 20, 22. For PAM 4 the output optical signal varies between 4 levels or states.

Alternatively, the E/O device 10 may be configured to support PAM 2 by having a single E/O amplitude modulator in just one of the first and second waveguide arms 16, 18. PAM 2 is also referred to as non-return-to-zero (NRZ) since the output optical signal varies between 2 levels or states.

When modulating an optical input signal based on phase differences between optical waveguide arms, as in the prior art, the optical waveguide arms typically need to be a sufficient length in order for the phase differences to be determined. For a PN modulation diode, a minimum length of 3 mm is usually needed for each optical waveguide arm. This effects the size and compactness of electro-optic (E/O) devices.

In the illustrated embodiment, a length of the first and second optical waveguide arms 16, 18 can be shortened since phase differences between the first and second optical waveguide arms do not need to be determined since the phases are equal. The length of the first and second optical waveguide arms 16, 18 may be 10-20 µm, for example. Consequently, the E/O device 10 may be smaller in size and more compact as compared to E/O devices that rely on phase differences in the optical waveguide arms for changing states of an output optical signal. Moreover, operation of the E/O device 10 is simplified since phase differences between the first and second optical waveguide arms 16, 18 do not need to be determined.

The first and second E/O amplitude modulators 20, 22 may be configured as optical ring modulators. An optical ring modulator includes a modulation diode (PN, PIN, other) embedded in a ring resonator. For illustration purposes, a PIN modulation diode 52 includes a ring resonator 50 formed on a substrate 54, as shown in FIG. 2. The ring 50 may have a radius R within a range of 5-10 µm, for example. A bias voltage source 56 is coupled to the ring modulation device 52 for control thereof by applying a bias voltage to change dynamically the amplitude of the optical signal within the optical waveguide, which in turn changes a level or state of the optical signal.

In silicon photonics, i.e., where silicon is used as an optical medium, the optical ring modulators may be configured to operate in different wavelength bands. For silicon photonics, a wavelength band of the optical signals being modulated may be 1260-1360 nm (O-band), 1460-1530 nm (S-band) and 1530-1565 nm (C-Band), for example. However, the optical ring modulators are not limited to these wavelength bands. An optical ring resonator 50 has multiple resonant frequencies and resonantly couples light in the ring, as readily understood by those skilled in the art.

Figure 3:
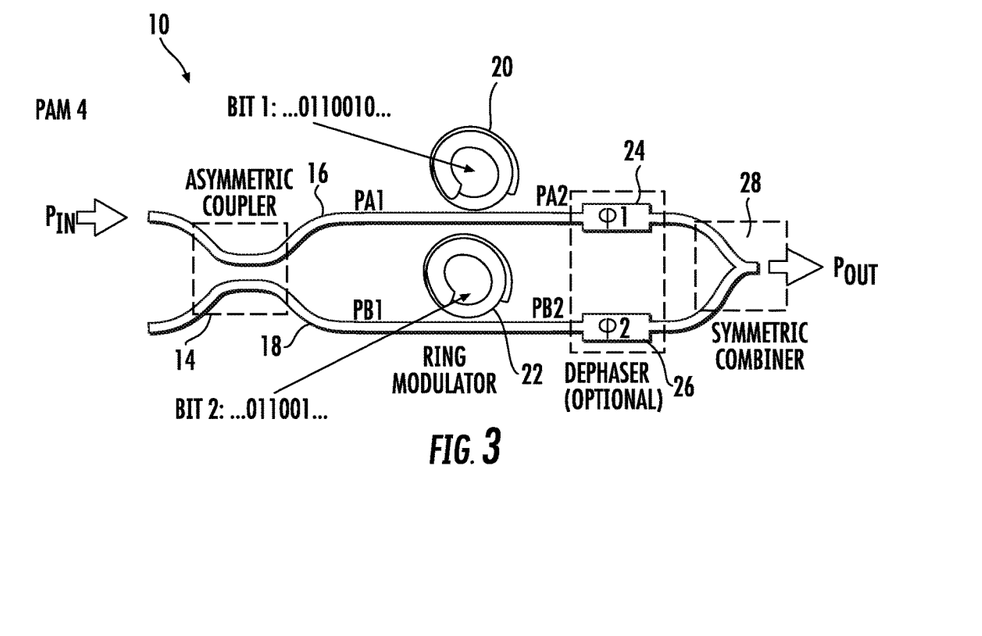
FIG. 3 is a schematic diagram of the E/O device illustrated in FIG. 1 configured to provide multilevel modulation of an optical input signal based on a PAM 4 modulation.
Figure 4:
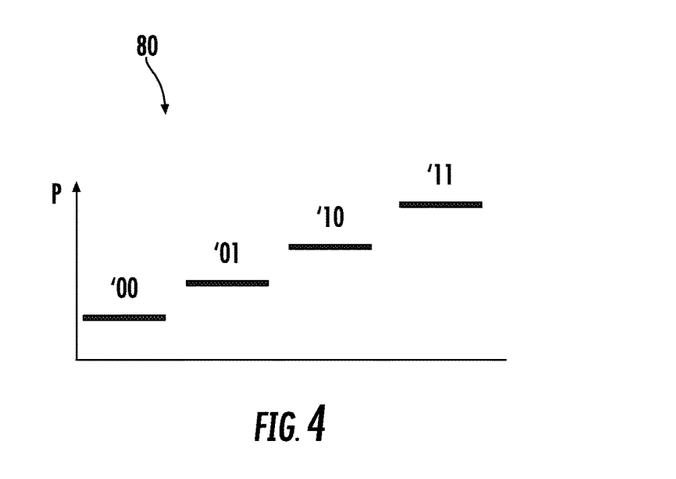
FIG. 4 is a graph illustrating the multilevel states of an optical output signal provided by the E/O device illustrated in FIG. 3.

Referring now to FIGS. 3 and 4, the illustrated E/O device 10 is configured to provide multilevel modulation of an optical input signal $P_{in}$ based on a PAM 4 modulation. The following discussion provides a series of equations to illustrate that the difference in phase in the optical waveguide arms 16, 18 does not change. Instead, the power level of the optical signals in the optical waveguide arms 16, 18 change so as to change levels or states of an optical output signal $P_{out}$.

The power of the optical input signal Pin is asymmetrically split by the first asymmetric optical coupler 14 in optical waveguide sections PA1 and PB1. The first asymmetric optical coupler 14 may be an asymmetric multimode interference (MMI) coupler or an asymmetric dc coupler, for example.

The power of the optical input signal is split based on a splitting ratio α. Assuming zero loss, $P_{in}=PA1+PB1$ $PA1=\alpha*P_{in}$ $PB1=(1-\alpha)*P_{in}$ The power at the output PA2 of the optical ring modulator 20 is a function of bit 1, and the input power. Similarly, the power at the output PA2 of the optical ring modulator 22 is a function of bit 0, and the input power.

$PA2=f(PA1,bit1)$ $PB2=f(PB1,bit0)$

When a bit=1 then the power is $P_1$, and when a bit=0 then the power is $P_0$. After the optical ring modulators 20, 22, the power level of the optical signals is assumed to vary linearly with amplitude:

$Pring(1)=k0*P_{in}$ $Pring(0)=k1*P_{in}$ $PA2(bit1=1)=k1*\alpha*P_{in}$ $PA2(bit1=0)=k0*\alpha*P_{in}$ $PB2(bit2=1)=k1*(1-\alpha)*P_{in}$ $PB2(bit2=0)=k0*(1-\alpha)*P_{in}$ $P_1=k1*P_{in}$ $P_0=k0*P_{in}$ At the output of the first optical combiner 28, the interferometer equation is $P_{out}=PA2+PB2+(PA2*PB2)^{1/2}*\cos(\phi1-\phi2)$ φ1 is the phase in the first optical waveguide arm 16, and φ2 is the phase in the second optical waveguide arm 18.

The first optical combiner 28 is a symmetric combiner. The symmetric combiner may be a multimode interference (MMI) Y-junction coupler, for example.

In order to have 4 levels linearly spaced between "0" power and "1" power, α and φ1−φ2 are be chosen. Operation of the optical ring modulators 20, 22 is different than a MZ modulator. In a MZ modulator, a difference of phase creates the difference in amplitude at the output of the optical combiner 28. In the illustrated embodiment, the difference in phase in each optical waveguide arm 16, 18 does not change. Instead, the phase in the optical waveguide arms 16, 18 is the same, and the power in each optical waveguide arm is different. The phase thus remains constant but the amplitude is changed.

A graph 80 illustrating the four different output levels or states of the optical output signal $P_{out}$ based on a PAM 4 modulation is provided in FIG. 4. The 4 different output states are '00, '01, '10 and '11. Equations of the E/O device 10 for the PAM 4 modulation are as follows:

$$P('11)=\alpha*P_1+(1-\alpha)*P_1+(P_1*P_1)^{1/2}*\cos(\phi1-\phi2)$$

$$P('10)=\alpha*P_1+(1-\alpha)*P_0+(P_1*P_0)^{1/2}*\cos(\phi1-\phi2)$$

$$P('01)=\alpha*P_0+(1-\alpha)*P_L+(P_0*P_1)^{1/2}*\cos(\phi1-\phi2)$$

$$P('00)=\alpha*P_0+(1-\alpha)*P_0+(P_0*P_0)^{1/2}*\cos(\phi1-\phi2)$$

To insure that the phase in each of the optical waveguide arms 16, 18 are the same, the E/O device may include a phase adjuster 24, 26 for each optical waveguide arm 16, 18. The phase adjusters 24, 26 are optional, and are primarily needed when the asymmetric coupler has a phase shift associated therewith that needs to be cancelled out between the two optical waveguide arms 16, 18.

Figure 5:
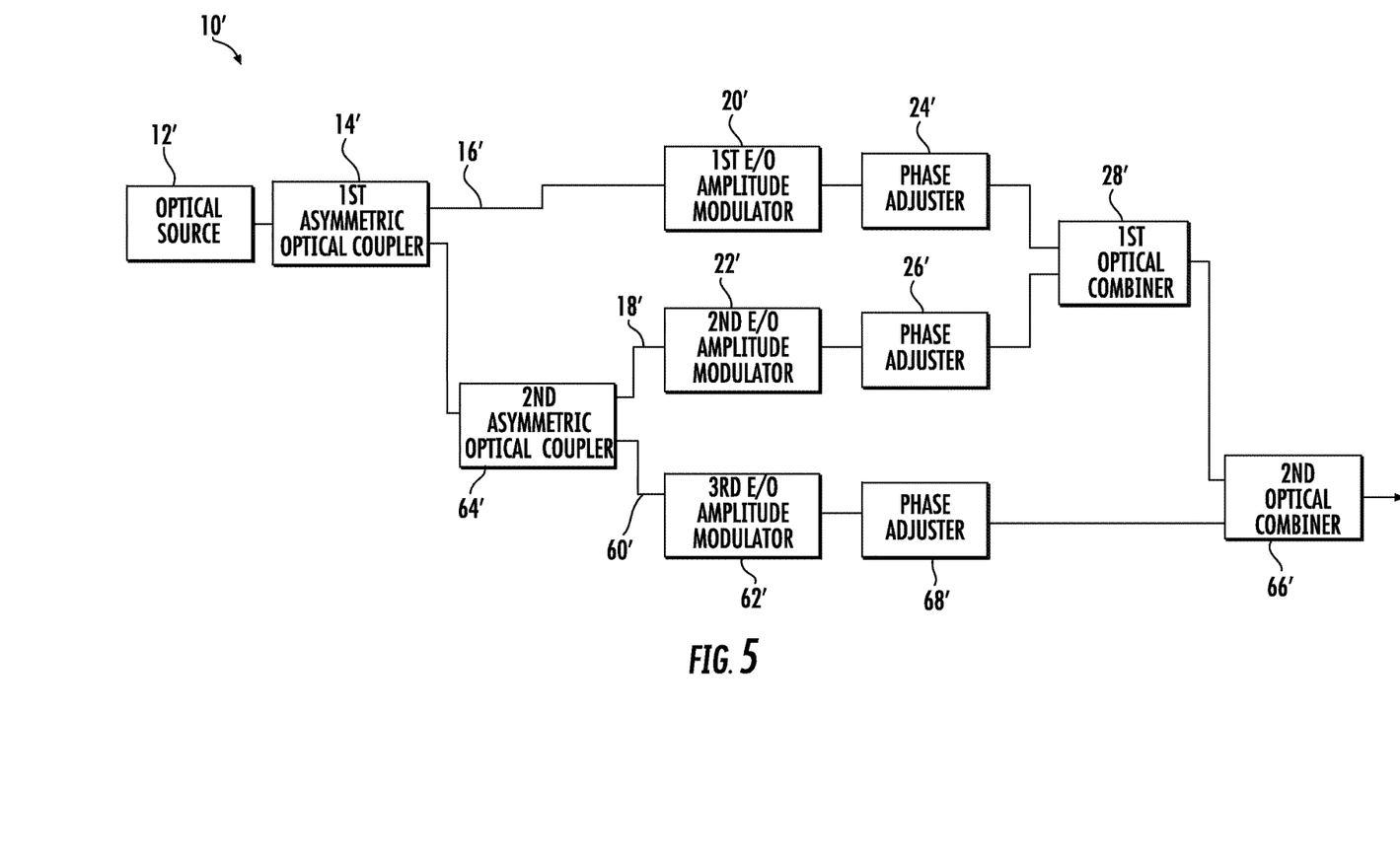
FIG. 5 is a block diagram of another embodiment of the E/O device illustrated in FIG. 1 and configured to operate based on a PAM 8 modulation.
Figure 6:
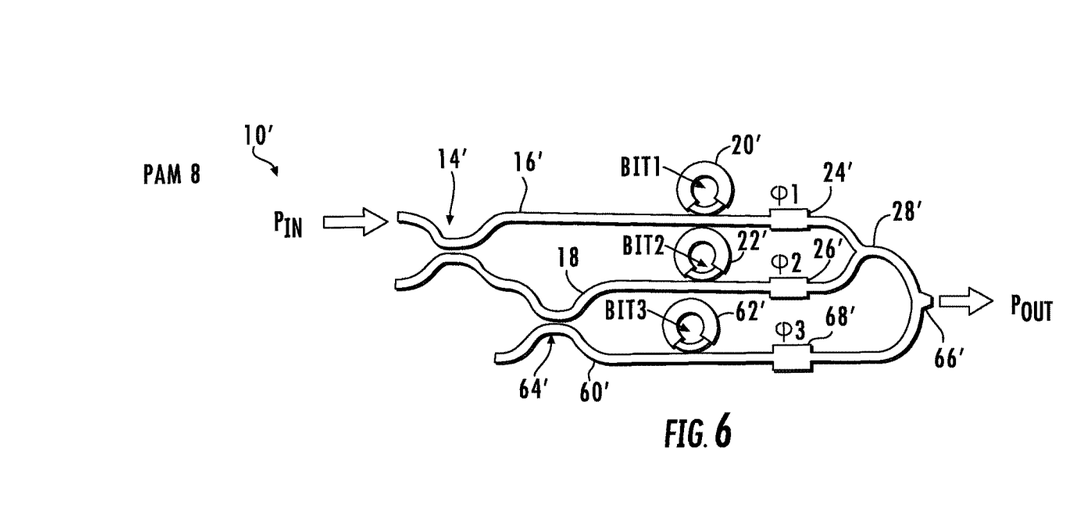
FIG. 6 is a schematic diagram of the E/O device illustrated in FIG. 5.

Referring now to FIGS. 5 and 6, a block diagram and a schematic diagram of the E/O device 10' are provided where a third optical waveguide arm 60' and a third E/O amplitude modulator 62' are added so that the E/O device 10' is configured to operate based on a PAM 8 modulation.

The E/O device 10' also further includes a second asymmetric coupler 64' having an input coupled to the second output of the first asymmetrical coupler 14' and having first and second outputs, with the first output of the second asymmetric coupler 64' being coupled to the second optical waveguide arm 18'. The third optical waveguide arm 60' is coupled to the second output of the second asymmetric coupler 64'. A second optical combiner 66' is coupled to an output of the first optical combiner 28' and the third optical waveguide arm 60'. The third optical waveguide arm 60' includes an optional optical phase adjuster.

Figure 7:
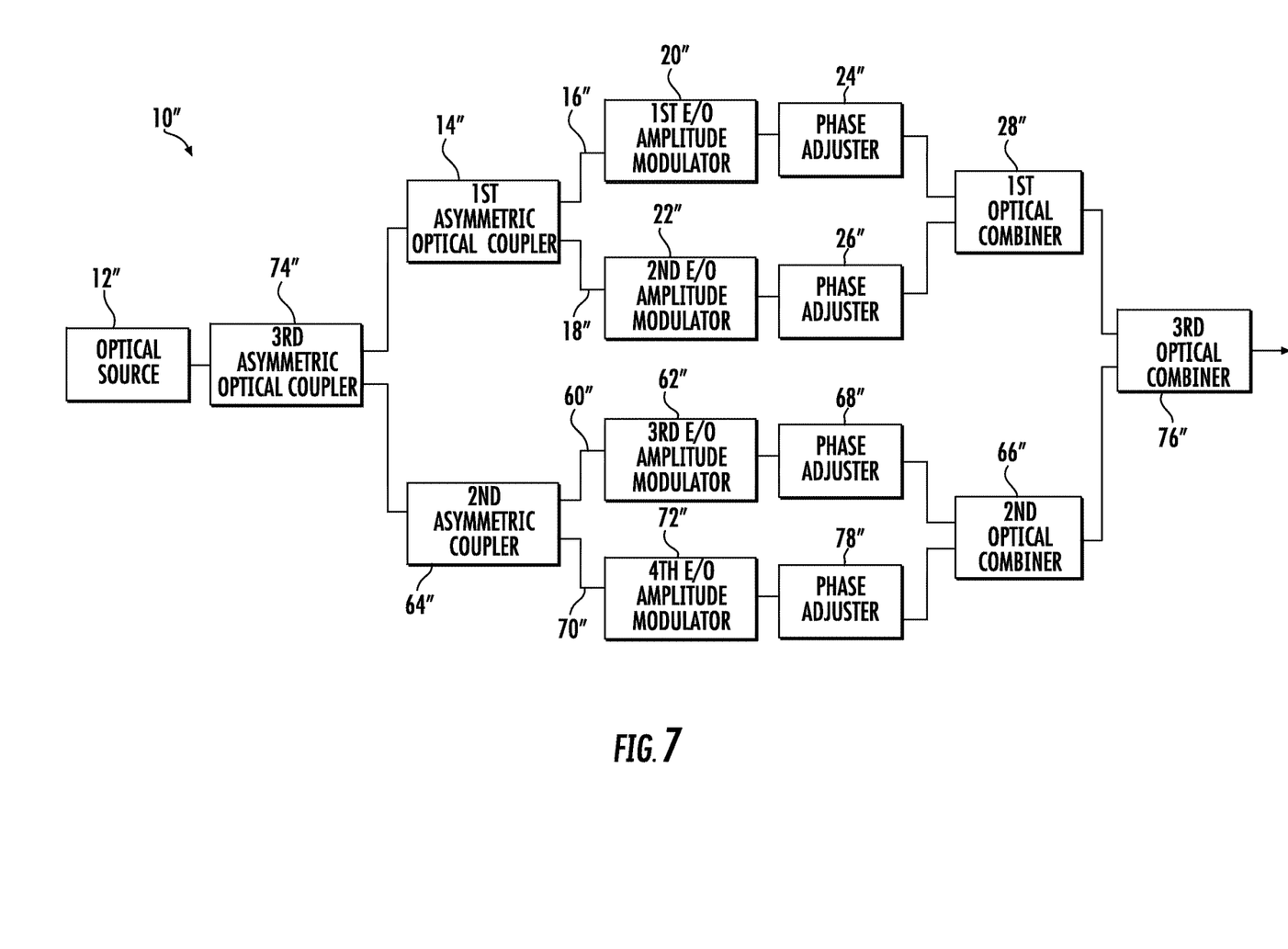
FIG. 7 is a block diagram of yet another embodiment of the E/O device illustrated in FIG. 1 and configured to operate based on a PAM 16 modulation.
Figure 8:
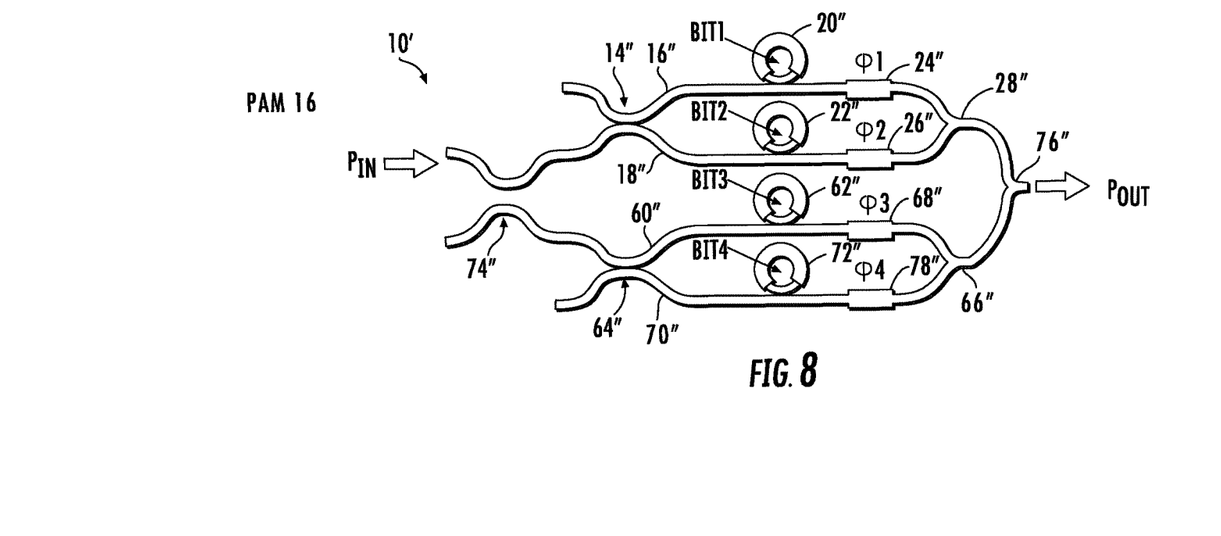
FIG. 8 is a schematic diagram of the E/O device illustrated in FIG. 7.

Referring now to FIGS. 7 and 8, a block diagram and a schematic diagram of the E/O device 10" are provided where third and fourth optical waveguide arms 60", 70" and third and fourth E/O amplitude modulators 62", 72" are added so that the E/O device 10" is configured to operate based on a PAM 16 modulation.

The E/O device 10" further includes a second asymmetric optical coupler 64" having an input and first and second outputs, a third optical waveguide arm 60" coupled to the first output of the second asymmetric optical coupler 64", and a fourth optical waveguide arm 70" coupled to the second output of the second asymmetric optical coupler 64". A third E/O amplitude modulator 62" is coupled to the third optical waveguide arm 60". A fourth E/O amplitude modulator 72" is coupled to the fourth optical waveguide arm 70". A second optical combiner 66" is coupled to the third and fourth optical waveguide arms 60", 70" downstream from the third and fourth E/O amplitude modulators 62", 72". A third asymmetric optical coupler 74" having first and second outputs is coupled to respective inputs the first and second asymmetric couplers 14", 64". A third optical combiner 76" having first and second inputs is coupled to respective outputs of the first and second combiners 28", 66". The third and fourth optical waveguide arms 60", 70" include optional phase adjusters 68", 78".

Figure 9:
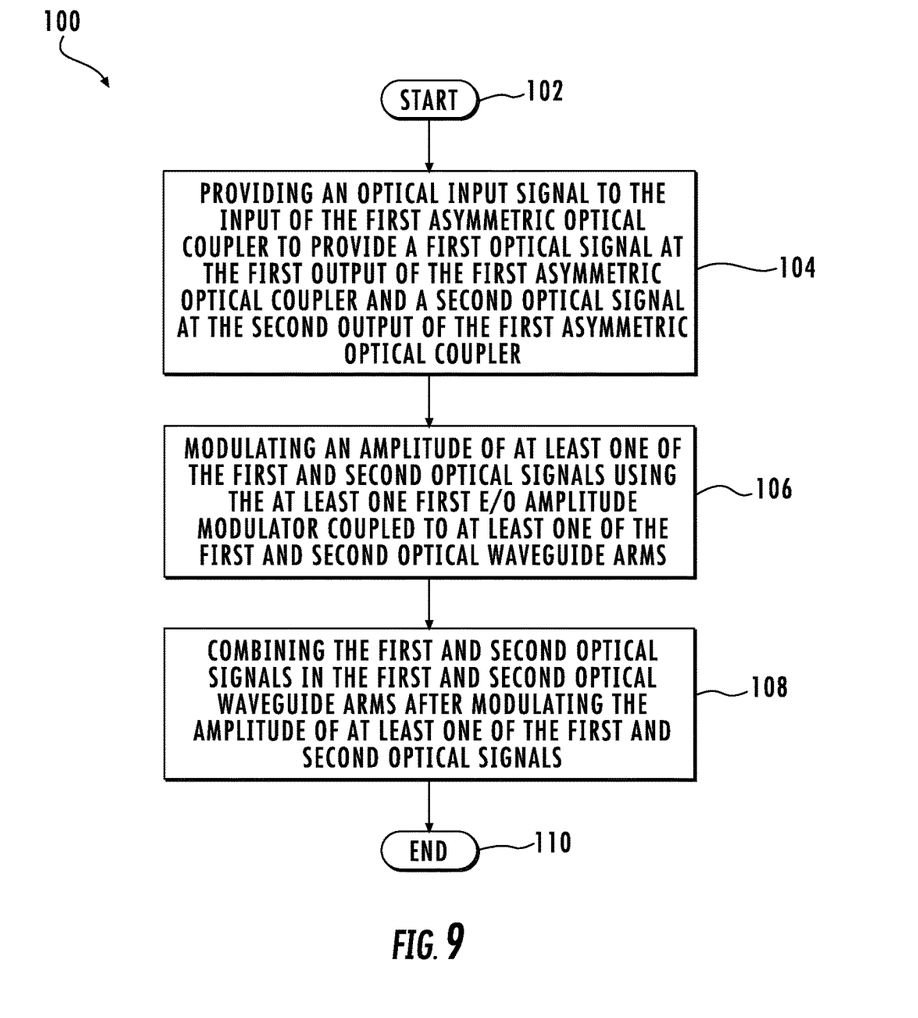
FIG. 9 is a flowchart illustrating a method for modulating an optical input signal using the E/O device illustrated in FIG. 1.

Referring now to the flowchart 100 illustrated in FIG. 9, a method for modulating an optical input signal using an electro-optic (E/O) device 10 will be discussed. The E/O device 10 includes a first asymmetric optical coupler 14 having an input and first and second outputs, a first optical waveguide arm 16 coupled to the first output of the first asymmetric optical coupler, and a second optical waveguide arm 18 coupled to the second output of the first asymmetric optical coupler. At least one first E/O amplitude modulator 20 is coupled to at least one of the first and second optical waveguide arms 16, 18. A first optical combiner 28 is coupled to the first and second optical waveguide arms 16, 18 downstream from the at least one first E/O amplitude modulator 20.

From the start (Block 102), the method comprises providing an optical input signal to the input of the first asymmetric optical coupler 14 at Block 104 to provide a first optical signal at the first output of the first asymmetric optical coupler 14 and a second optical signal at the second output of the first asymmetric optical coupler 14. An amplitude of at least one of the first and second optical signals is modulated at Block 106 using the at least one first E/O amplitude modulator 20 coupled to at least one of the first and second optical waveguide arms 16, 18. The method further includes combining the first and second optical signals in the first and second optical waveguide arms 16, 18 after modulating the amplitude of at least one of the first and second optical signals at Block 108. The method ends at Block 110.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electro-optic (E/O) device comprising:
   a first asymmetric optical coupler having an input and first and second outputs;
   a first optical waveguide arm coupled to the first output of said first asymmetric optical coupler;
   a second optical waveguide arm coupled to the second output of said first asymmetric optical coupler;
   said first and second optical waveguide arms having a same length with first and second optical signals received by said first and second optical waveguide arms having equal phases but at different power levels;
   at least one first E/O amplitude modulator coupled to at least one of said first and second optical waveguide arms; and
   a first optical combiner coupled to said first and second optical waveguide arms downstream from said at least one first E/O amplitude modulator.

2. The E/O device according to claim 1 further comprising an optical source coupled to the input of said first asymmetric optical coupler and configured to generate a continuous optical input signal.

3. The E/O device according to claim 1 wherein said at least one first E/O amplitude modulator comprises an optical ring modulator.

4. The E/O device according to claim 3 wherein said optical ring modulator comprises a ring having a radius within a range of 5-10 μm.

5. The E/O device according to claim 1 wherein said at least one E/O amplitude modulator comprises:
   a first optical ring modulator coupled to said first optical waveguide arm; and
   a second optical ring modulator coupled to said second optical waveguide arm.

6. The E/O device according to claim 1 wherein said first asymmetric coupler comprises at least one of an asymmetric multimode interference (MMI) coupler and an asymmetric dc coupler.

7. The E/O device according to claim 1 wherein said first optical combiner comprises a symmetric combiner.

8. The E/O device according to claim 1 wherein said first optical combiner comprises a multimode interference (MMI) Y-junction coupler.

9. The E/O device according to claim 1 further comprising at least one optical phase adjuster coupled to at least one of said first and second optical waveguide arms.

10. The E/O device according to claim 1 further comprising:
a second asymmetric coupler having an input coupled to the second output of said first asymmetrical coupler and having first and second outputs, the first output of said second asymmetric coupler coupled to said second optical waveguide arm;
a third optical waveguide arm coupled to the second output of said second asymmetric coupler;
at least one second E/O amplitude modulator coupled to said third optical waveguide arm; and
a second optical combiner coupled to an output of said first optical combiner and said third optical waveguide arm downstream from said at least one second E/O amplitude modulator.

11. The E/O device according to claim 1 further comprising:
a second asymmetric optical coupler having an input and first and second outputs;
a third optical waveguide arm coupled to the first output of said second asymmetric optical coupler;
a fourth optical waveguide arm coupled to the second output of said second asymmetric optical coupler;
at least one second E/O amplitude modulator coupled to at least one of said third and fourth optical waveguide arms;
a second optical combiner coupled to said third and fourth optical waveguide arms downstream from said at least one second E/O amplitude modulator;
a third asymmetric optical coupler having first and second outputs coupled to respective inputs said first and second asymmetric couplers; and
a third optical combiner having first and second inputs coupled to respective outputs of said first and second combiners.

12. An electro-optic (E/O) device comprising:
an optical source configured to generate a continuous optical input signal;
a first asymmetric optical coupler having an input coupled to said optical source and having first and second outputs;
a first optical waveguide arm coupled to the first output of said first asymmetric optical coupler;
a second optical waveguide arm coupled to the second output of said first asymmetric optical coupler;
said first and second optical waveguide arms having a same length with first and second optical signals received by said first and second optical waveguide arms having equal phases but at different power levels;
a first E/O amplitude modulator coupled to said first optical waveguide arm;
a second E/O amplitude modulator coupled to said second optical waveguide arm; and
a first symmetric optical combiner coupled to said first and second optical waveguide arms downstream from said first and second E/O amplitude modulators.

13. The E/O device according to claim 12 wherein said first E/O amplitude modulator comprises a first optical ring modulator, and said second E/O amplitude modulator comprises a second optical ring modulator.

14. The E/O device according to claim 13 wherein said first and second optical ring modulators each comprises a ring having a radius within a range of 5-10 μm.

15. The E/O device according to claim 12 wherein said first asymmetric coupler comprises at least one of an asymmetric multimode interference (MMI) coupler and an asymmetric dc coupler.

16. The E/O device according to claim 12 wherein said first optical combiner comprises a multimode interference (MMI) Y-junction coupler.

17. The E/O device according to claim 12 further comprising at least one optical phase adjuster coupled to at least one of said first and second optical waveguide arms.

18. The E/O device according to claim 12 further comprising:
a second asymmetric coupler having an input coupled to the second output of said first asymmetrical coupler and having first and second outputs, the first output of said second asymmetric coupler coupled to said second optical waveguide arm;
a third optical waveguide arm coupled to the second output of said second asymmetric coupler; and
a second optical combiner coupled to an output of said first optical combiner and said third optical waveguide arm.

19. The E/O device according to claim 12 further comprising:
a second asymmetric optical coupler having an input and first and second outputs;
a third optical waveguide arm coupled to the first output of said second asymmetric optical coupler;
a fourth optical waveguide arm coupled to the second output of said second asymmetric optical coupler;
at least one third optical E/O amplitude modulator coupled to at least one of said third and fourth optical waveguide arms;
a second optical combiner coupled to said third and fourth optical waveguide arms downstream from said at least one third E/O amplitude modulator;
a third asymmetric optical coupler having first and second outputs coupled to respective inputs said first and second asymmetric couplers; and
a third optical combiner having first and second inputs coupled to respective outputs of said first and second combiners.

20. A method for modulating an optical input signal using an electro-optic (E/O) device comprising a first asymmetric optical coupler having an input and first and second outputs; a first optical waveguide arm coupled to the first output of the first asymmetric optical coupler; a second optical waveguide arm coupled to the second output of the first asymmetric optical coupler; at least one first E/O amplitude modulator coupled to at least one of the first and second optical waveguide arms; and a first optical combiner coupled to the first and second optical waveguide arms downstream from the at least one first E/O amplitude modulator, the method comprising:
providing an optical input signal to the input of the first asymmetric optical coupler to provide a first optical signal at the first output of the first asymmetric optical coupler and a second optical signal at the second output of the first asymmetric optical coupler;
modulating an amplitude of at least one of the first and second optical signals using the at least one first E/O amplitude modulator coupled to at least one of the first and second optical waveguide arms, the first and second optical waveguide arms having a same length with the first and second optical signals received by the first and second optical waveguide arms having equal phases but at different power levels; and combining the first and second optical signals in the first and second optical waveguide arms after modulating the amplitude of at least one of the first and second optical signals.

21. The method according to claim 20 wherein the E/O device further comprises an optical source coupled to the input of the first asymmetric optical coupler, the method further comprising operating the optical source to generate a continuous optical input signal.

22. The method according to claim 20 wherein the at least one first E/O amplitude modulator comprises an optical ring modulator.

23. The method according to claim 20 wherein the at least one E/O amplitude modulator comprises a first optical ring modulator coupled to the first optical waveguide arm, and a second optical ring modulator coupled to the second optical waveguide arm; and wherein the modulating comprises modulating the amplitude of both of the first and second optical signals.

24. The method according to claim 20 wherein the first optical combiner comprises a symmetric combiner.

25. The method according to claim 20 wherein the E/O device further comprises at least one optical phase adjuster coupled to at least one of the first and second optical waveguide arms, the method further comprising operating the at least one optical phase adjuster to adjust a phase of at least one of the first and second optical signals so that the phases between the first and second optical signals are equal.

* * * * *